United States Patent [19]

Volkmar et al.

[11] 4,309,934
[45] Jan. 12, 1982

[54] HYDRAULIC BRAKE BOOSTER

[75] Inventors: Werner Volkmar, Waldorf; Helmut Steffes, Eschborn, both of Fed. Rep. of Germany

[73] Assignee: ITT Industries, Inc., New York, N.Y.

[21] Appl. No.: 67,269

[22] Filed: Aug. 17, 1979

[30] Foreign Application Priority Data

Sep. 22, 1978 [DE] Fed. Rep. of Germany ....... 2841262

[51] Int. Cl.$^3$ .......................... F15B 9/10; F15B 13/10
[52] U.S. Cl. .................................... 91/373; 91/376 R; 91/391 R
[58] Field of Search ................ 91/370, 371, 372, 373, 91/376 R, 391 R

[56] References Cited

U.S. PATENT DOCUMENTS

| | | | |
|---|---|---|---|
| 2,761,427 | 9/1956 | Shumaker | 91/373 |
| 2,883,971 | 4/1959 | Ayers, Jr. | 91/373 |
| 2,953,120 | 9/1960 | Ayers, Jr. | 91/373 |
| 3,747,473 | 7/1973 | Bach et al. | 91/373 |

Primary Examiner—Paul E. Maslousky
Attorney, Agent, or Firm—John T. O'Halloran; Alfred C. Hill

[57] ABSTRACT

A hydraulic booster for a brake system comprising a booster piston, a pressure-control device, an annular piston bearing against the booster piston and a central piston which is movable within limits relative to the annular piston by the brake pedal and actuates the pressure-control device. In this arrangement, the central piston and the annular piston are adapted to be coupled together after the force of a spring is overcome whereupon these two pistons are movable as one. The central piston is permanently subjected to the pressure acting on the booster piston when the brake system is actuated.

9 Claims, 2 Drawing Figures

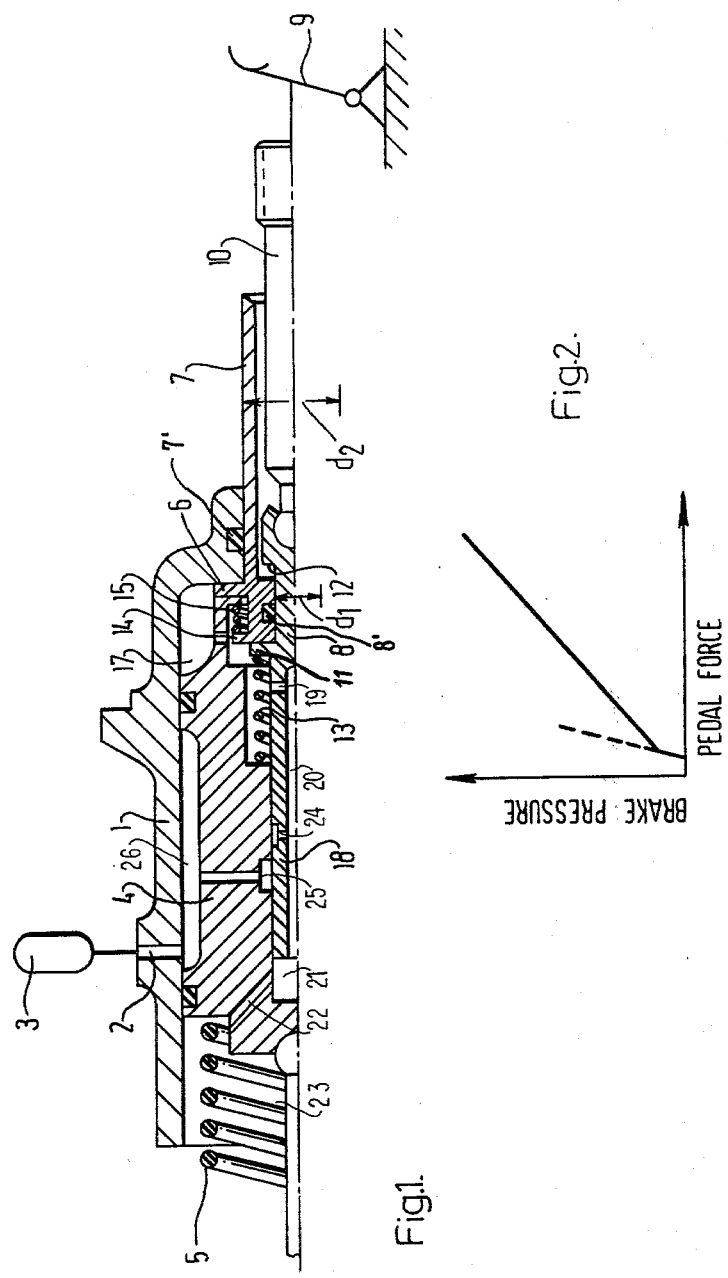

HYDRAULIC BRAKE BOOSTER

BACKGROUND OF THE INVENTION

This invention relates to a hydraulic brake booster with a booster piston, a pressure-control device, an annular piston bearing against the booster piston, and a central piston which is movable within limits relative to the annular piston by the brake pedal and actuates the pressure-control device, with the central piston and the annular piston being adapted to be coupled together after the force of a spring is overcome whereupon they are movable as one. A hydraulic brake booster of this type is known from German Pat. DE-OS No. 2,348,857.

In this known hydraulic brake booster, the central piston bears against an axially displaceable valve casing which controls a dual-seat valve. Exactly like all other components of the pressure-control device, this valve casing is pressure-balanced, which is expressly mentioned at the beginning of page 11 of the above-cited German patent.

From this feature it results that a predetermined brake pressure develops abruptly after a response force is overcome. This will be welcomed by the vehicle operator if a vehicle equipped with an automatic gearbox is to be prevented from rolling away by means of the brake pedal with the engine running idle while at standstill. However, if the brake is to be applied very sensitively, for example, on an icy road, there is the danger of the abrupt pressure buildup in the brake system causing lock-up of the brakes even before the range of the brake force becomes effective, i.e., a counter-force which is proportional to the brake pressure starts acting on the annular piston and, thus, on the central piston and the brake pedal.

SUMMARY OF THE INVENTION

It is an object of the present invention to design a hydraulic brake booster of the type referred to hereinabove in such a manner that at the beginning of the braking action the brake pressure is able to develop rapidly using only low pedal forces, but that, upon the attainment of a specific magnitude this brake pressure is built up with a modified conventional transmission ratio, with the booster permitting, however, sensing of the controlled delivery of brake pressure at the brake pedal at the beginning of the pressure development, whereby it is possible to brake sensitively at low brake pressures.

A feature of the present invention is the provision of a hydraulic brake booster comprising a housing having a longitudinal axis; a booster piston disposed coaxial of the axis in a slidable sealed relation to the inner surface of the housing; a pressure-control device disposed coaxial of the axis within the booster piston; an annular piston disposed coaxial of the axis and bearing against one end of the booster piston; and a central piston disposed coaxial of the axis and within the annular piston and the booster piston, the central piston being movable within limits relative to the annular piston by a brake pedal and actuates the pressure-control device, the central piston and the annular piston being adapted to be coupled together after the force of a first spring is overcome so that the central piston and the annular piston are movable as one, the central piston being permanently subjected to a pressure acting on the booster piston throughout a braking operation.

When the response force of the hydraulic booster, which force is necessary to overcome friction, is overcome and when a pressure develops in the pressure chamber of the booster, there occurs a counter-pressure at the central piston and, thus, a counter-force at the brake pedal. Because of the small surface area of the central piston, this pressure experiences a marked increase at a slight increase in the brake-pedal force, so that it is possible to apply the brakes using low pedal forces, as is the case in the booster of the above cited German patent, and to achieve a low braking effect. This is desirable, for example, in vehicles equipped with an automatic gearbox where, with the engine running, it is always necessary to use the pedal brake to prevent the vehicle from rolling away. In contrast to the prior hydraulic brake booster, however, the brake booster of the present invention permits a counter-force to act upon the brake pedal at the beginning of the pressure development, so that sensitive braking is possible as early as in the initial stages of pressure development.

In an advantageous embodiment of this invention, which affords a particularly simple design, the booster housing accommodates a pressure chamber bounded on its one end by the booster piston and having on its other end the annular piston and the central piston extending thereinto with their respective effective areas.

In another advantageous embodiment of this invention, a weak spring keeps the annular piston in abutment with the booster piston, and the annular piston is movable into abutment with a collar of the central piston against the force of this spring.

The force of this spring determines what is termed the two-stage action. As soon as the annular piston is in abutment with the collar of the central piston, the energy stored by the spring is retained, i.e., the spring does not impair the proportionality that is desirable for the brake feel.

In still another advantageous embodiment of this invention, the pressure-control device has a control spool which is integrally formed with the central piston. This embodiment is substantially simpler than the known embodiment, which will become readily obvious when comparing the number of individual components necessary for the booster of this invention with that of the known booster.

It will also be an advantage if, in another embodiment of the present invention, the central piston has a collar with which it is held in abutment with the annular piston by the force of a spring engaged between it and the booster piston, with its other collar being spaced from the annular piston.

By means of this design, the central piston is in abutment with the annular piston in the inactive state of the arrangement, with the annular piston being in turn held in abutment with a stop formed in the housing by the return spring of the booster piston. Thus, in the inactive position all movable parts of the booster are in abutment with a stop formed in the housing, so that the normal position of the booster is precisely defined.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross section through part of a brake booster constructed in accordance with the principles of the present invention; and FIG. 2 is a graph of the brake pressure versus the pedal force in the brake booster of FIG. 1.

DESCRIPTION OF THE PREFERRED EMBODIMENT

Referring to FIG. 1, the brake booster of the present invention includes a housing 1 with a fluid inlet port 2 that is in permanent communication with a pressure accumulator 3. Sealed to and axially slidable within housing 1 is a booster piston 4 which is held in abutment with a collar 6 of an annular piston 7 by means of a return spring 5, so that collar 6 of annular piston 7 on the side remote from booster piston 4 is in abutment with housing 1.

Provided within annular piston 7 is a central piston 8 against which a brake pedal 9 bears by means of a tappet 10. Central piston 8 has a first collar 11 which abuts against annular piston 7 in the illustrated inactive position, because a spring 13 engaged between collar 11 of central piston 8 and the booster piston 4 preloads central piston 8 in the direction of brake pedal 9.

In the inactive position, a second collar 12 of central piston 8 is spaced from annular piston 7. Annular piston 7 has in turn a collar 14 against which one end of spring 15 bears. The other end of spring 15 bears against booster piston 4 and preloads annular piston 7 in the brake-applying direction, so that its collar 6 is held in abutment with booster piston 4.

In the direction towards booster piston 4, central piston 8 continues as a control spool 18 which is conventionally designed such that a pressure chamber 17 formed between housing 1 and booster piston 4 is connectible with an unpressurized reservoir (not shown), or alternatively pressure accumulator 3.

Central piston 8 extends through annular piston 7 into pressure chamber 17 in sealed contact with annular piston 7 at seal 8'. Central piston 8, which is an annular piston, has a circular contact area with annular piston 7 at seal 8' defined by the diameter $d_1$ shown in FIG. 1. Annular piston 7 extends through housing 1 coaxial of and surrounding central piston 8 into pressure chamber 17 in sealed contact with housing 1 at seal 7'. Annular piston 7 has a circular contact area with housing 1 at seal 7' defined by the diameter $d_2$ shown in FIG. 1. The circular contact area at seal 7' defined by diameter $d_2$ minus the circular contact area at seal 8' defined by diameter $d_1$ is subjected to the pressure of pressure chamber 17 and, therefore, the pressure effective area of annular piston 7 at seal 7' is defined by $(d_2-d_1)$.

The mode of operation of the hydraulic brake booster of FIG. 1 will now be explained, making at the same time reference to FIG. 2.

In the inactive position shown, pressure chamber 17 is connected to an unpressurized reservoir (not shown) through radial bore 19, axial bore 20, chamber 21, channel 22 and reservoir return chamber 23. Depression of brake pedal 9 causes displacement of central piston 8 and thereby displacement of control spool 18 to the left, when viewing the drawing, so that the connection of pressure chamber 17 to the unpressurized reservoir is initially interrupted when control spool 18 closes channel 22 and a connection of pressure chamber 17 to pressure accumulator 3 is established through radial bore 19, axial bore 20, radial bores 24 and 25, chamber 26 and inlet port 2. As a result, a pressure will start developing in pressure chamber 17, which pressure acts on the end of booster piston 4, adjacent chamber 17 and also immediately on the effective area defined by diameter $d_1$ of central piston 8. From this it results that a counter-force will be felt at brake pedal 9 through central piston 8 at the beginning of pressure buildup, which counter-force is, however, very low since the area defined by diameter $d_1$ is small. The pressure buildup in pressure chamber 17 causes displacement of booster piston 4 in the actuating direction, so that brake application is initiated in the conventional manner. The function of spring 15 is initially to cause annular piston 7 to follow the movement of booster piston 4 and to hold its collar 6, in abutment with booster piston 4. However, since the pressure in pressure chamber 17 also acts on the effective area defined by $(d_2-d_1)$, as defined above, i.e., on annular piston 7, the latter commences being gradually displaced to the right, when viewing the drawing, in opposition to the force of spring 15, until it is in abutment with collar 12 of central piston 8. With the brake application continuing further, displacement of central piston 8 necessarily causes shifting of annular piston 7, too, so that the counter-force occurring is always the force that is produced by the pressure acting in pressure chamber 17 on the effective area defined by diameter $d_2$.

FIG. 2 makes the correlations clear. At the beginning of brake application, frictional forces of the brake booster must be overcome so that brake pressure cannot build up yet in the presence of very low pedal forces. However, when the frictional forces are overcome, the pressure develops rapidly since the effective area defined by diameter $d_1$ is very small. When annular piston 7 is in abutment with collar 12 of central piston 8, central piston 8 and annular piston 7 have to be moved into pressure chamber 17 jointly with the effective area defined by diameter $d_2$, so that the brake pressure builds up with a smaller slope in relation to the pedal force, which can be seen by the bent course of the curve in the graph of FIG. 2.

While we have described above the principles of our invention in connection with specific apparatus it is to be clearly understood that this description is made only by way of example and not as a limitation to the scope of our invention as set forth in the objects thereof and in the accompanying claims.

We claim:

1. A hydraulic brake booster comprising:
   a housing having a longitudinal axis;
   a booster piston disposed coaxial of said axis in a slidable sealed relation to the inner surface of said housing;
   a pressure-control device disposed coaxial of said axis within said booster piston;
   an annular piston disposed coaxial of said axis having a first collar thereon disposed between a step in said housing and the adjacent end of said booster piston to enable said annular piston to bear against said adjacent end of said booster piston; and
   a central piston disposed coaxial of said axis and within said annular piston and said booster piston, said central piston being movable within limits relative to said annular piston by a brake pedal and actuates said pressure-control device, said central piston and said annular piston being adapted to be coupled together after the force of a first spring is overcome by fluid pressure so that said central piston and said annular piston are movable as one, said first spring acting between a surface of said booster piston spaced inwardly from said adjacent end of said booster piston and a second collar at an end of said annular piston within said booster piston spaced from said first collar, said central piston being subjected to a pressure acting on said booster piston throughout a braking operation.

2. A booster according to claim 1, further including a pressure chamber disposed within said housing being bounded on one side thereof by said adjacent end of said booster piston and on another side by a portion of said housing and having adjacent said another side effective areas of both said annular piston and said central piston present in said pressure chamber.

3. A booster according to claim 2, wherein
said first spring is a weak spring to keep said annular piston in abutment with said booster piston at the start of said braking operation, and
said annular piston is movable against the force of said weak spring into abutment with a third collar carried by said central piston disposed within said annular piston and spaced from said adjacent end of said booster piston.

4. A booster according to claim 3, wherein
said pressure-control device includes
a control spindle disposed coaxial of said axis within said booster piston formed as an integral part of said central piston.

5. A booster according to claim 4, wherein
said central piston further includes
a fourth collar disposed within said booster piston spaced from said third collar, said fourth collar being held in abutment with the adjacent end of said annular piston by the force of a fourth spring engaged between said second collar and a surface within said booster piston.

6. A booster according to claim 1, wherein
said first spring is a weak spring to keep said annular piston in abutment with said booster piston at the start of said braking operation, and
said annular piston is movable against the force of said weak spring into abutment with a third collar carried by said central piston disposed within said annular piston and spaced from said adjacent end of said booster piston.

7. A booster according to claim 6, wherein
said pressure-control device includes
a control spindle disposed coaxial of said axis within said booster piston formed as an integral part of said central piston.

8. A booster according to claim 7, wherein
said central piston further includes
a fourth collar disposed within said booster piston spaced from said third collar, said fourth collar being held in abutment with the adjacent end of said annular piston by the force of a second spring engaged between said fourth collar and a surface within said booster piston.

9. A booster according to claim 1, wherein
said pressure-control device includes
a control spindle disposed coaxial of said axis within said booster piston formed as an integral part of said central piston.

* * * * *